United States Patent [19]

Roberts

[11] 4,157,870

[45] Jun. 12, 1979

[54] EXPOSURE STATION

[75] Inventor: William E. Roberts, Palos Verdes Penn., Calif.

[73] Assignee: AM International, Inc., Los Angeles, Calif.

[21] Appl. No.: 823,931

[22] Filed: Aug. 12, 1977

Related U.S. Application Data

[63] Continuation-in-part of Ser. No. 652,635, Jan. 26, 1976, abandoned.

[51] Int. Cl.² ............................................. G03B 27/04
[52] U.S. Cl. .................................. 355/121; 350/269; 354/236; 354/250; 354/264; 355/36; 355/71; 355/101
[58] Field of Search ..................... 355/36, 42, 71, 101, 355/121, 124; 350/269; 354/226, 236, 250, 261, 264, 265

[56] References Cited

U.S. PATENT DOCUMENTS 3,602,579  8/1971  Silvertooth ........................ 355/36 X

*Primary Examiner*—Richard A. Wintercorn
*Attorney, Agent, or Firm*—Michael A. Kondzella

[57] ABSTRACT

A microfiche duplicator exposure station where a copy sheet lies facewise over a master while an elongated lamp shines light through the master to expose the copy sheet. A shutter that controls exposure, includes two plates lying over the lamp and a solenoid that quickly pivots the plates to positions beside opposite ends of the lamp to allow light from the lamp to reach the microfiche. The plates have mirror surfaces extending at an incline of about 60° from the vertical when the plates are at opposite ends of the lamp, to shine light onto opposite ends of the microfiche, to thereby compensate for low illumination thereat produced by an elongated lamp.

9 Claims, 3 Drawing Figures

EXPOSURE STATION

CROSS-REFERENCE TO RELATED APPLICATIONS

This is a continuation-in-part of U.S. Pat. application Ser. No. 652,635, filed Jan. 26, 1976 now abandoned.

BACKGROUND OF THE INVENTION

This invention relates to a contact copying apparatus, and especially such an apparatus utilized to duplicate microfiche.

A microfiche, which is a sheet of film containing miniature images such as many pages of a document, can be duplicated by the contact printing method. My earlier patent application Ser. No. 652,635, filed Jan. 26, 1976, describes a microfiche duplicator which can utilize a bank of fluorescent aperture lamps at the exposure station where light shines through the master microfiche onto the copy sheet microfiche. However, where more rapid duplication is required, a jacketed mercury vapor lamp may be utilized, which can produce more light but which must be left on for extended periods and utilized with a shutter. Such a lamp is typically of elongated shape, with a short arc tube which can lie directly under the position where the microfiche are held, and is utilized with a substantially parabolic reflector extending around the axis of the lamp to reflect collimated light towards the microfiche. This arrangement produces uneven illumination of the microfiche, with the end portions of the microfiche which lie over or beyond opposite ends of the lamp, receiving a lower level of illumination than the middle portion of the microfiche. Additional reflectors can be utilized to increase the illumination at the end portions of the microfiche, but such reflectors would have to lie close to the lamp to capture significant amounts of light and provide collimated light at the microfiche, and would have to avoid interference with the shutter mechanism.

SUMMARY OF THE INVENTION

In accordance with one embodiment of the present invention, an exposure station is provided for a contact printer, which effectively controls illumination of an imaging plane portion where a master microfiche and copy sheet microfiche are facewise adjacent. In an exposure station which includes an elongated lamp lying under and extending parallel to an axis of the microfiche that are to be illuminated, a shutter mechanism is provided, which includes a pair of shutter elements that are pivotally mounted on the frame of the device. A solenoid means quickly pivots the shutter elements from a position over the lamp to positions beside either end of the light-emitting portion of the lamp. Each of the shutter elements has a reflective surface that extends at an incline from the axis of the lamp and which lies beside an end of the light-emitting lamp portion, to reflect light from the lamp onto a corresponding end region of the microfiche. This reflected light from the lamp, which would otherwise be wasted, is directed largely perpendicular to the imaging plane and largely parallel to other light rays, so that the end portions of the master are illuminated with light that can produce a sharp image on the copy sheet.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
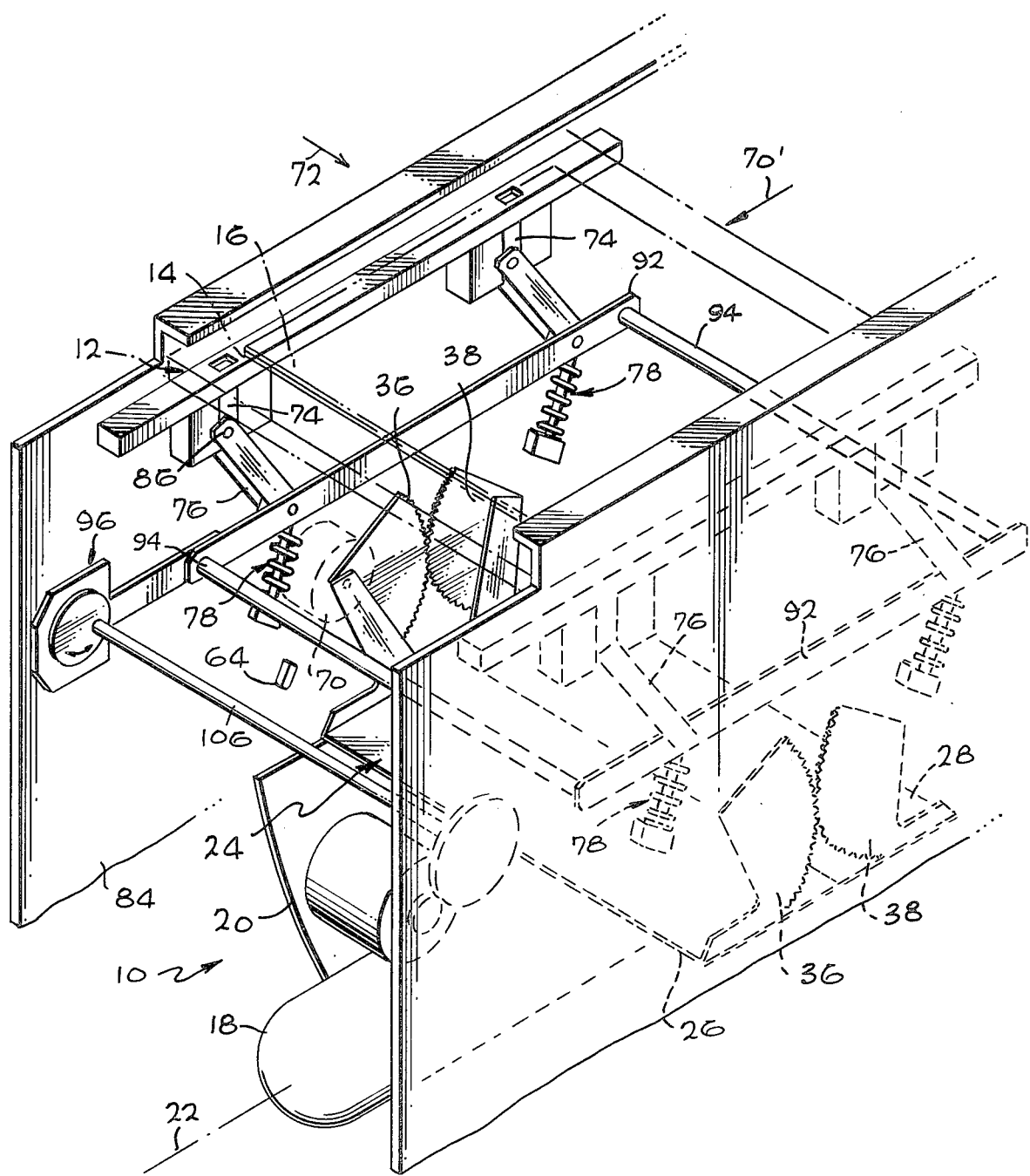
FIG. 1 is a perspective view of an exposure station apparatus constructed in accordance with the invention.

FIG. 1 illustrates an exposure station 10 which includes a microfiche holder 12 for holding a master microfiche 14 which is to be duplicated and a copy sheet microfiche 16 of unexposed film. Light from the arc tube 40 of a jacketed mercury vapor lamp 18 shines through a glass plate of the holder 12 onto the microfiche. A largely parabolic reflector 20 which is curved about the axis 22 of the lamp, reflects light from the lamp onto the microfiche to increase the light intensity. The lamp 18 cannot be rapidly turned on as needed and therefore is left on indefinitely, while the amount of light reaching the microfiche is controlled by a shutter mechanism 24.

Figure 2:
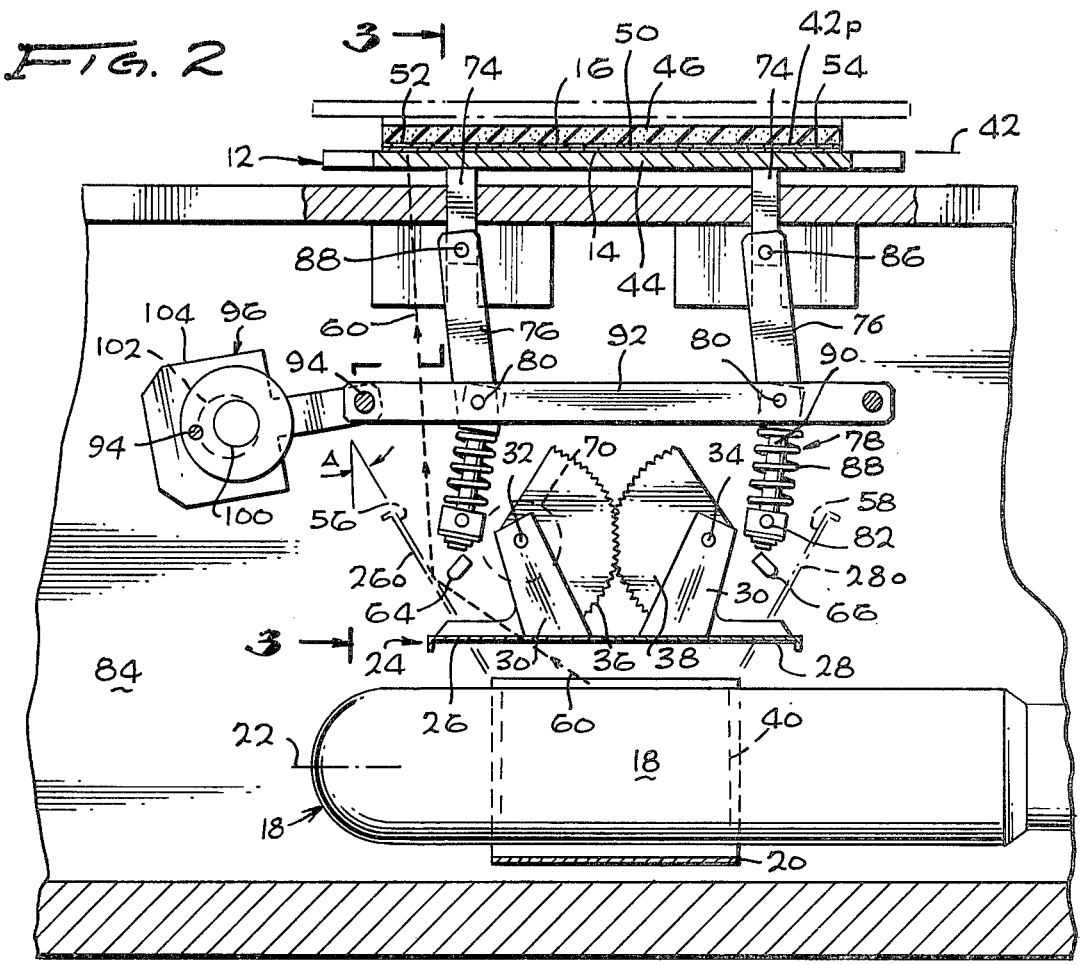
FIG. 2 is a sectional side view of the apparatus of FIG. 1.
Figure 3:
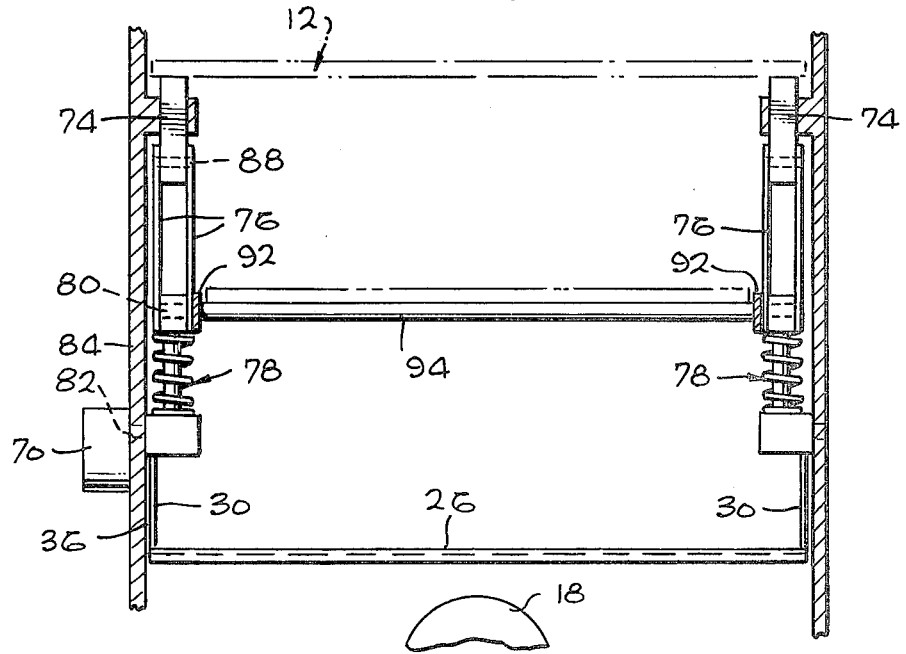
FIG. 3 is a view taken on the line 3—3 of FIG. 2.

As shown in FIG. 2, the shutter mechanism 24 includes a pair of plate-like elements 26, 28 that are each pivotally mounted by means of levers 30 attached to either side of the element, about laterally-extending axes 32, 34. The axes 32, 34 lie at a height between the lamp and the plane of the microfiche (in a case where the lamp lies directly below the microfiche). A pair of gear segments 36, 38 are mounted on the corresponding levers and are meshed with one another, to cause both elements to pivot at the same time about their respective axes. The gear segments are positioned so that the axes 32, 34 lie coincident with the axes of the gear segments.

Each element 26, 28 can pivot from the closed position shown in solid lines in FIG. 2, wherein the elements are aligned, to the open positions shown in phantom lines at 26o-28o. When the elements are pivoted to their open positions, light can pass from an arc tube 40 of the lamp, which has a much smaller length than the microfiche, towards an imaging plane 42 where the master 14 and copy sheet 16 are very close or in contact with one another. The master and copy sheet are maintained in close facewise adjacency by reason of being pressed from below by a glass plate 44 and pressed from above by a compressible pad 46, which may be constructed of elastomeric material.

The use of a lamp with a short arc tube 40 and a cylindrical reflector 20 results in uneven illumination of the image plane portion 42p occupied by the master microfiche 14 and copy sheet microfiche 16. The middle region 50 of this image plane portion is well illuminated, but the opposite end regions 52, 54 are not as well illuminated, since they are further from the middle of the arc tube 40. This is especially true where the length of the arc tube 40 is less than the length of the image plane portion 42p occupied by the microfiche. In utilizing any device to increase illumination at the end regions 52, 54 of the microfiche, care must be taken to assure that light directed thereat is fairly well collimated with the rest of the light, to avoid the production of a blurred image on the copy sheet.

In accordance with the present invention, the elements 26, 28 are provided with highly reflective surfaces 56, 58, that serve as mirrors. Also, the shutter mechanism 24 is constructed so that when the elements 26, 28 are pivoted away from their closed position over the lamp, the reflective surfaces 56, 58 extend at an angle A of approximately 30° (i.e. between 15° and 45°) from the vertical direction which is normal to the image plane 42, as seen in the sectional view of FIG. 2. As a result, light rays such as ray 60 which would otherwise be lost, are reflected by a surface such as 56 towards an end region 52 of the image plane which lies over the reflective surface 56. With the reflective surfaces in these positions, nearly all of the light reflected from these surfaces 56, 58 which reach the image plane portions 52, 54, reach the portion lying directly or nearly directly above the corresponding reflective surface. Since the reflective surface such as 56 lies under the corresponding end regions 52 of the image plane portion, these light rays extend nearly perpendicular to the image plane 42 and are largely parallel to most of the other light rays that reach the microfiche. A pair of stops 64, 66 can be provided to engage the levers 30 of the elements when they pivot to their open positions 26o, 28o, to fix these positions. A rotary solenoid 70 (FIG. 1) connected to one of the gear segments 36, pivots the gear segment 36, while segment 36 pivots the other gear segment 38 to move both elements 26, 28 between their open and closed positions. Thus, by pivotally mounting the elements 26, 28 so they can move between positions abutting one another over the lamp portions and angled towards a primarily vertical orientation, and with reflecting upper surfaces on the elements, the shutter performs both a shuttering or blocking function and a light distribution function, utilizing a simple mechanism.

In order to utilize the exposure station, the master microfiche 14 (FIG. 1) is installed on the holder 12 and the holder is slid along the direction of arrow 70 until it lies over the lamp 18 as shown. The copy sheet is then moved in the direction of arrow 72 until it lies on the master 14. Four lift pins 74 then move up to press the master and copy sheet against the pressing pad 46 (FIG. 2) so that the two microfiche sheets are held close together, and in fact in intimate contact where the master is not jacketed by a protective plastic film. The mechanism for moving the pins 74 includes an upper link 76 and a lower link 78 which are pivotally connected together at 80. The lower end of the lower link is pivotally mounted at 82 on a machine frame 84, while the upper end of the upper link is pivotally connected at 86 to the corresponding lift pin 74. The lower link 78 comprises a spring 88 which connects the pivot points 80 and 82, and a spring guide rod 90 which serves only to guide the spring but not to transmit forces between the pivot pins 80 and 82. An activating mechanism for operating the links includes a horizontal bar 92 that is pivotally connected to the links at 80 and which has an end connected at rod 94 to a reciprocating mechanism 96. The reciprocating mechanism 96 includes a rotating shaft 100 carrying an eccentric member 102 which is closely received by a recess in a coupling 104, so that as the shaft 100 turns, the coupling 104 moves in a circular path (without turning). The shaft 100 is turned by a gear head motor. Rods 94 connect the horizontal bar 92 to another corresponding bar at the opposite side of the mechanism.

The use of a spring 88 to connect the upper link 96 to the pivot point 82 on the machine frame, permits the mechanism to resiliently press up the lift pin 74 against the microfiche holder. If the pins 74 tend to lift the holder too high, the spring 88 will be compressed slightly more. The resiliency of the spring 88 is counteracted by the resiliency of the elastomeric pad 46 against which the microfiche are pressed.

Thus, the invention provides an exposure station for contact duplicating systems, which is of simple construction and yet which closely controls the exposure of a copy sheet. The apparatus includes mirror or reflective surfaces at either side of the unjacketed portion of a lamp, and which are oriented about 30° from the image plane (i.e. a line normal to the mirror surface extends about 60° from a line normal to the image plane), to reflect light rays from the lamp that are largely normal to the image plane, towards the opposite ends of the image plane region where the copy sheet is adjacent to the master. The reflective elements are utilized as shutters, by pivotally mounting them so they can move from the above-described reflective positions, to blocking positions wherein they lie over opposite halves of the lamp portion to block the transmission of light from the lamp to the copy sheet. The copy sheet is held on a holder which is raised against an elastomeric pad by lift pins operated by a link mechanism wherein one of the links comprises a spring.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In an exposure station which includes an exposure plane region and a light source positioned to emit light rays toward said exposure region, the improvement comprising:
   a pair of shutter elements, each pivotally mounted about a corresponding predetermined axis located at a height between said lamp and the exposure plane region; and
   means for rapidly pivoting said elements simultaneously between a first position wherein said elements lie over substantially opposite halves of the paths of light rays travelling directly from said light source towards said exposure region, to block such light rays to a second position wherein said elements lie beside opposite sides of said light source wherein each of said shutter elements is reflective at the surface thereof which faces said exposure plane when the elements are in said first position, and when said elements are in said second position they reflect light from said lamp to said exposure plane region.

2. The improvement described in claim 1 wherein:
   each of said shutter elements is reflective at the surface thereof which faces said exposure plane when the elements are in said first position, and when said elements are in said second position they reflect light from said lamp to said exposure plane region.

3. In an exposure station which includes an exposure plane portion, and a lamp and reflector assembly positioned to emit direct light rays along paths that illuminate said exposure region but which leave opposite end regions of the exposure plane portion illuminated at a lower intensity than the middle region thereof, the improvement comprising:
   a shutter having a pair of shutter elements with first surfaces which are reflective; and
   means for moving said shutter elements between a first position wherein said elements block said direct light rays, and a second position wherein said elements lie beside opposite sides of the paths of said direct light rays and said first surfaces reflect light to said opposite end regions of said explosive plane portion.

4. The improvement described in claim 3 wherein:
said lamp and reflector assembly includes an elongated illuminated lamp portion, and a reflector which is concave substantially only about the axis of said lamp portion; and
said shutter elements when in said second position, lie at opposite ends of said lamp portion.

5. In an exposure station which includes an exposure plane having a rectangular portion where a master and copy sheet are held substantially in contact, a lamp having a portion lying under said exposure plane region to illuminate it, and a cylindrical type reflector lying under and about said lamp portion to direct light rays from said lamp portion to said exposure plane portion, the improvement comprising:
a pair of mirrors lying at locations above opposite ends of said lamp portion, each mirror angled to direct light emanating from the middle of the lamp to the end region of said exposure plane portion which is nearest that mirror, whereby to provide light largely perpendicular to the exposure plane at said end region which would otherwise be underilluminated.

6. The improvement described in claim 5 including:
means for rapidly moving said mirrors from a first position wherein they lie substantially coplanar and over said lamp portion to block the passage of light to said exposure plane region, to said locations at opposite ends of said lamp portion, whereby to provide a shutter that controls exposure.

7. The improvement described in claim 5 wherein:
said mirrors extend at about 30° from a direction perpendicular to said image plane.

8. An exposure station for illuminating a rectangular area at a predetermined exposure plane comprising:
an elongated lamp with a light-emitting portion, said lamp extending substantially along a predetermined axis;
a largely cylindrical reflector with a middle portion lying on a side of said lamp opposite said exposure plane; and
a pair of substantially flat reflectors lying near opposite ends of said lamp portion, each flat reflector extending at an angle of about 60° from an orientation wherein its plane is parallel with said exposure plane, to reflect light from the lamp to opposite sides of said rectangular exposure plane area.

9. In an exposure station which includes a frame; a master holder movable on said frame and having an upper surface for holding a master sheet and a copy sheet facewise adjacent to one another, and a pressing pad mounted on said frame over the master holder to press the sheets together when the master holder is pressed up towards the pressing pad, the improvement comprising:
a plurality of lift pins lying under said master holder and movable upwardly to raise the holder against said pressing pad;
a plurality of upper and lower links, the lower end of each lower link pivotally coupled to said frame, the upper end of each lower link pivotally coupled to the lower end of an upper link; and
an activating mechanism which includes a substantially horizontal bar pivotally coupled to said links near the upper end of said lower link and the lower end of said upper link, and
means for moving said bar substantially horizontally;
one of said links comprising a spring for resiliently absorbing compression forces along the length of the link.

* * * * *